United States Patent [19]
Yukishita

[11] Patent Number: 5,006,245
[45] Date of Patent: Apr. 9, 1991

[54] WATER PURIFYING DEVICE
[75] Inventor: Takeshi Yukishita, Toyohashi, Japan
[73] Assignee: Sanki System Product Co., Ltd., Tokyo, Japan
[21] Appl. No.: 477,324
[22] Filed: Feb. 8, 1990
[30] Foreign Application Priority Data
  Feb. 13, 1989 [JP] Japan ................. 1-15696[U]
[51] Int. Cl.$^5$ ............................................. C02F 9/00
[52] U.S. Cl. ........................... 210/256; 210/283; 210/284; 210/288
[58] Field of Search ............... 210/282-284, 210/288, 342, 439, 440, 256, 336-338

[56] References Cited
U.S. PATENT DOCUMENTS 1,432,351 10/1922 McGahan ................. 210/284
3,950,251 4/1976 Hiller ..................... 210/288
4,525,275 6/1985 Ostlund ................... 210/342

Primary Examiner—Ivars Cintins
Attorney, Agent, or Firm—Koda & Androlia

[57] ABSTRACT

A water purifying device including a cartridge type container which comprises an outer cylinder, an intermediate cylinder and an inner cylinder which are concentrically arranged in a compact housing of the purifying device. The outer and intermediate cylinders are connected at the top, the intermediate and inner cylinders are connected at the bottom, and the cylinders are filled with water purifying materials such as high purity active carbon, silver-somelite and ceramic balls so that water taken in via the housing's water inlet is purified while it flows through the three cylinders and is taken out through the housing's water outlet.

3 Claims, 6 Drawing Sheets

WATER PURIFYING DEVICE

BACKGROUND OF THE INVENTION

1. Field of the Invention

The present invention relates to a water purifying device for tap service, and more particularly to a water purifying device which can be installed within the counter area of a kitchen sink.

2. Prior Art

Many types of water purifying devices produce what is called "tasty water", which resembles natural spring water. One example of such a current device is shown in FIG. 7.

In the device shown in FIG. 7, the housing 1 made of a formed ABS resin cylinder is equipped with a water inlet joint 2 at the lower side which connects with a water hose 16. At the top of the center of the housing 1, a faucet 3 is attached. This configuration allows the device to be utilized as a table-top water purifier.

FIG. 8 illustrates the inner structure of the device. Inside the housing 1 is a detachable cartridge type purifying material container 7 which includes double-layered coaxial cylinders, the outer cylinder 4 and the inner cylinder 6. The top end of both the cylinder wall 4a of the outer cylinder 4 and the cylinder wall 6a of the inner cylinder 6 is commonly closed with a cap type upper cover plate 9. The bottom end of the cylinder wall 4a of the outer cylinder 4 is closed with a cap type lower cover plate 8. At the top portion of the cylinder wall 4a, connection holes 10 to the housing 1 are perforated.

High purity active carbon 11, made from coconut shells, serves as the water purifying material and is packed in the space between the outer cylinder 4 and the inner cylinder 6.

The bottom end of the cylinder wall 6a of the inner cylinder 6 is closed with a cap type lower end plate 12. At the bottom portion of the cylinder wall 6a, the connection holes 13 to the outer cylinder 4 are perforated. The lower part of the inside of inner cylinder 6 is packed with high purity active carbon 11 made from coconut shells.

A filter 14 lies on the layer of high purity active carbon 11, and silver-somelite 15, which is crushed natural coral sand coated with silver, is separately packed by the filter 14. Another filter 14 is placed on the layer of the silver-somelite 15, and the upper space inside of the inner cylinder 6 is connected to the faucet 3 which penetrates the upper cover plate 9.

When the water inlet joint 2 is connected with the water hose 16, and tap water is introduced into the housing 1, as indicated by the arrow marks, the water flows up inside of the housing 1, enters the inside of the outer cylinder 4 via the connection holes 10, flows down along the inside of the outer cylinder 4 and passes through the high purity active carbon layer 11. Then, the water enters the inner cylinder 6 through the connection holes 13 and successively passes through the high purity active carbon layer 11, the filter 14, the layer of silver-somelite 15, and another filter 14. Finally, the water flows out from the inner cylinder 6 and is supplied for service from the faucet 3.

While flowing through the passage, impurities in the water, such as residual chlorine, mal-odor kalk, and carcinogenic trihalomethane, are left in the high purity active carbon 11, the filters 14, and somelite 15, and the water is further purified in passage by sterilization of harmful microorganisms such as bacteria.

Conventional water purifying devices as described above include a cartridge type water purifying material container including coaxial outer and inner cylinders, and each of which is packed with a water purifying material. Compared with a single-cylinder structure, the double cylinder device as described above offers a larger contact area. Nevertheless, the contact area in conventional devices is insufficient for satisfactory water purification.

Furthermore, the performance of the water purifying material container tends to decrease within a relatively short period of time, and the frequency with which the container cartridge must be replaced is high. In addition, most conventional devices have the disadvantage of occupying a large amount of space on a kitchen counter, because they are table-top models.

SUMMARY OF THE INVENTION

The water purifying device of this invention is characterized in that inside of the housing is installed three coaxially arranged water purifying material container cartridge cylinders comprising an outer cylinder, an intermediate cylinder and an inner cylinder, and the top cover of the housing is provided with a water inlet joint and a water outlet joint.

More specifically, the outer cylinder is placed in the housing and has holes at the lower part thereof which are connected to the housing; the intermediate cylinder is coaxially placed inside of the outer cylinder and has holes at the upper part thereof which are connected to the outer cylinder; an upper cover plate closes the top openings of the outer and intermediate cylinders; a lower cover plate closes the bottom openings of the outer and intermediate cylinders; the inner cylinder is coaxially installed inside of the intermediate cylinder and is projected from the upper cover plate so that the inner cylinder is connected to the water outlet joint, the inner cylinder having connection holes at the bottom end which are connected to the intermediate cylinder; and water purifying materials are installed in the space between the outer cylinder and the intermediate cylinder and in the space between the intermediate cylinder and inner cylinder and also in the inner cylinder.

The water supplied from the water inlet joint flows successively through the housing, the outer cylinder, the intermediate cylinder, and the inner cylinder. After purification by the water purifying materials, the water flows out from the water outlet joint, which is connected to the top end of the inner cylinder.

With the above described structure, the water purifying device sufficiently purifies the water as it successively passes through the water purifying layers contained in the three sections separated by the outer cylinder, the intermediate cylinder, and the inner cylinder.

When the housing is formed as a closed high pressure container, water under high pressure can be introduced into the housing, and the high pressure allows the water to pass the long passage through the water purifying materials.

The water purifying device of this invention is relatively compact, occupying a small space in a kitchen sink counter. Furthermore, the device can be connected to the branch nozzle of the water supply piping under the kitchen sink counter, and a water supply under high pressure can be applied to the housing in contrast with conventional water purifying devices wherein water is introduced from the faucet on the sink. Thus, in the present invention water flows more easily than in conventional devices.

BRIEF DESCRIPTION OF THE DRAWINGS

This invention is illustrated in the drawings wherein.

DETAILED DESCRIPTION OF THE INVENTION

A detailed description of the embodiment of the invention is made according to the drawings.

As illustrated in FIG. 1, FIG. 2, FIG. 3, and FIG. 4, the housing 1 is a cylindrical closed pressure vessel made of stainless steel and consists of a cylindrical shell 1a and a top cover 1b. The cylindrical shell 1a and the top cover 1b are tightly joined by flanges and the outer periphery of these flanges are constricted by a metal tightening band 17 to ensure an air-tight fit.

Figure 2:
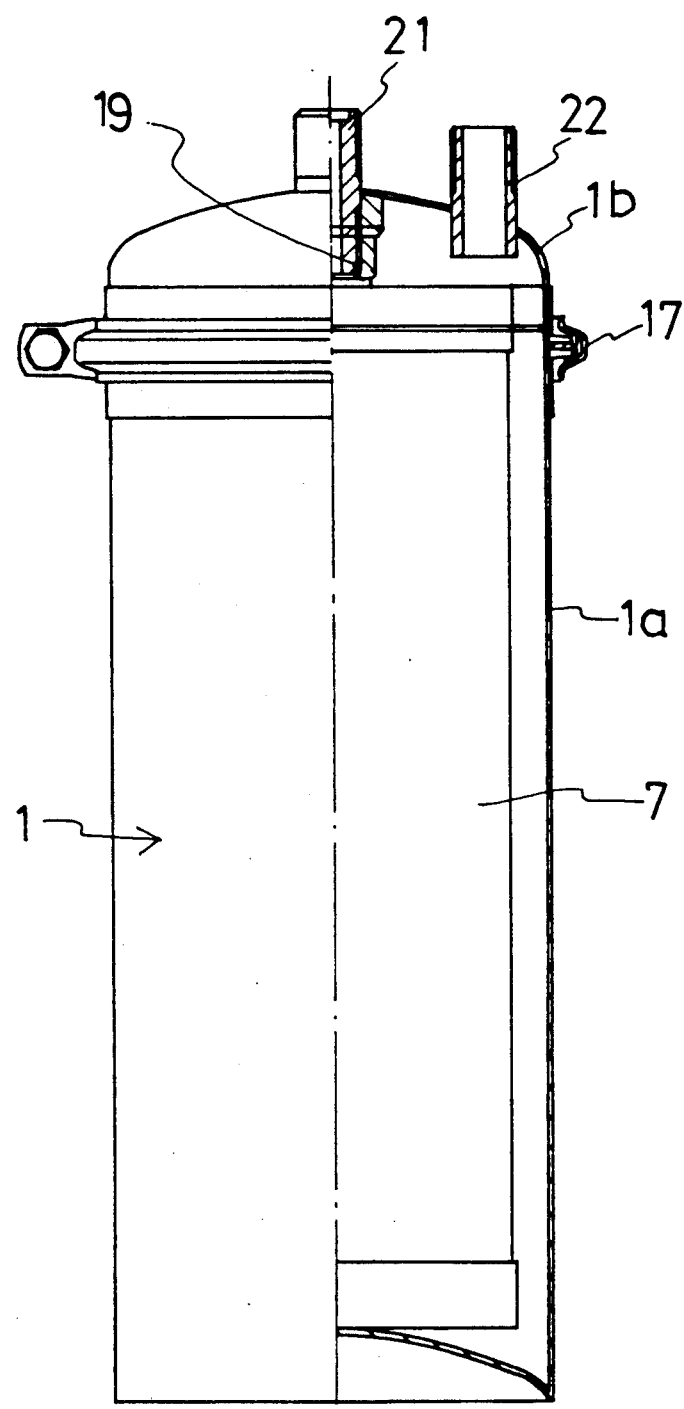
FIG. 2 is a partial sectional view of the device shown in FIG. 1.
Figure 3:
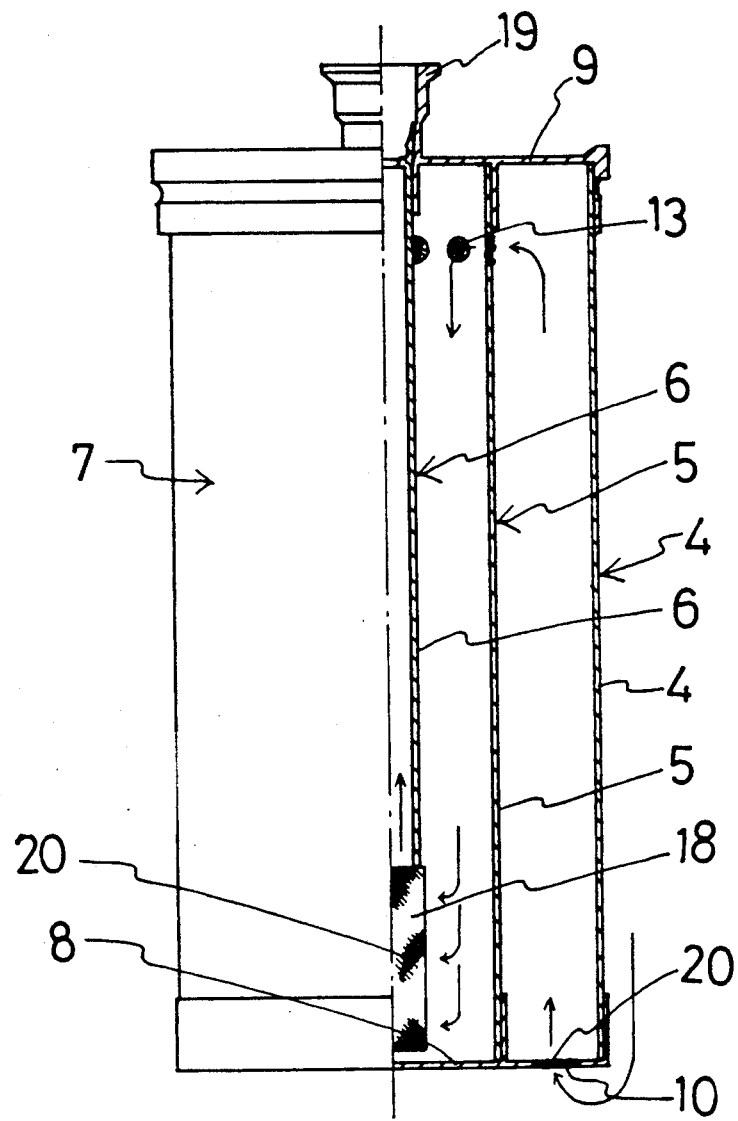
FIG. 3 is a partial sectional view of the water purifying material container shown in FIG. 1.

As shown in FIGS. 2 and 3, the cartridge type purifying material container 7 is constructed from three coaxial cylinders: the outer cylinder 4, the intermediate cylinder 5, and the inner cylinder 6. These three cylinders 4, 5 and 6 can be made of synthetic resin.

Figure 4:
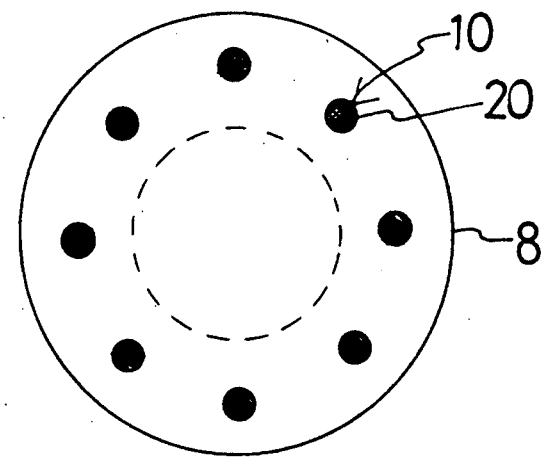
FIG. 4 is a bottom view of the container shown in FIG. 3.

Both ends of the outer cylinder 4 and the intermediate cylinder 5 are commonly closed with a cap type upper cover plate 9 and a cap type lower cover plate 8 at the top and bottom end of the outer cylinder wall 4a and the intermediate cylinder wall 5a. As shown in FIG. 4, the lower cover plate 8 has connection holes 10 to the housing 1.

Also, the upper part of the cylinder wall 5a of the intermediate cylinder 5 has connection holes 13 to the outer cylinder 4.

The inner cylinder 6 is a pipe, and the lower end of the pipe is opened to serve as a connection hole 18 to the inner area of the intermediate cylinder 5. The top end of the inner cylinder 6 projects upwardly from the center of the upper cover plate 9 and forms a water exit nozzle 19.

All the connection holes 10, 13 and 18 are covered with stainless steel wire mesh 20 to prevent inflow of water purifying materials. The stainless steel mesh 20 which covers the connection hole 18 is formed in a cylindrical shape.

A water outlet joint 21 is mounted at the center of the top cover 1b of the housing 1, and the water outlet joint 21 is connected to the water exit nozzle 19 at the top end of the inner cylinder 6. At the peripheral part of the top cover 1b of the housing 1, a water inlet joint 22 is mounted to introduce water across the housing 1.

Many types of water purifying materials can be used in the cartridge water purifying material container 7.

Figure 1:
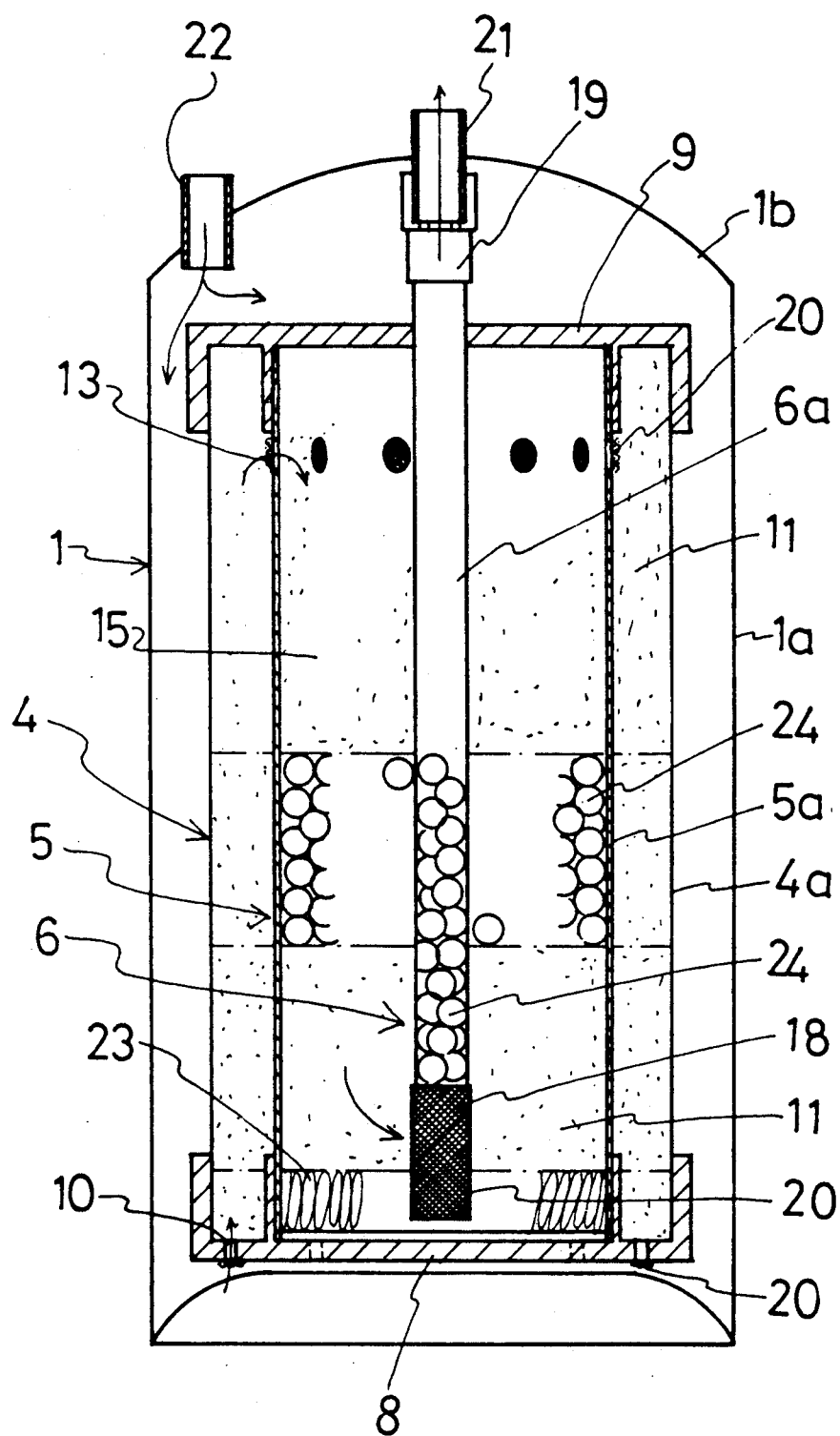
FIG. 1 shows a vertical cross sectional view of the water purifying device of the present invention.

FIG. 1 shows an example of an arrangement of water purifying materials. The space between the outer cylinder 4 and the intermediate cylinder 5 contains high purity active carbon 11 made from coconut shells. The space between the intermediate cylinder 5 and the inner cylinder 6 contains multiple layers of a packed bed of (from bottom to top) a special grade active carbon 23, high purity active carbon 11 made from coconut shells, ceramic balls 24 mainly made of iron dioxide salt, and silver-somelite 15, which is crushed natural coral sand specially coated with silver. The inside of the inner cylinder 6 is packed with ceramic balls 24.

Figure 5:
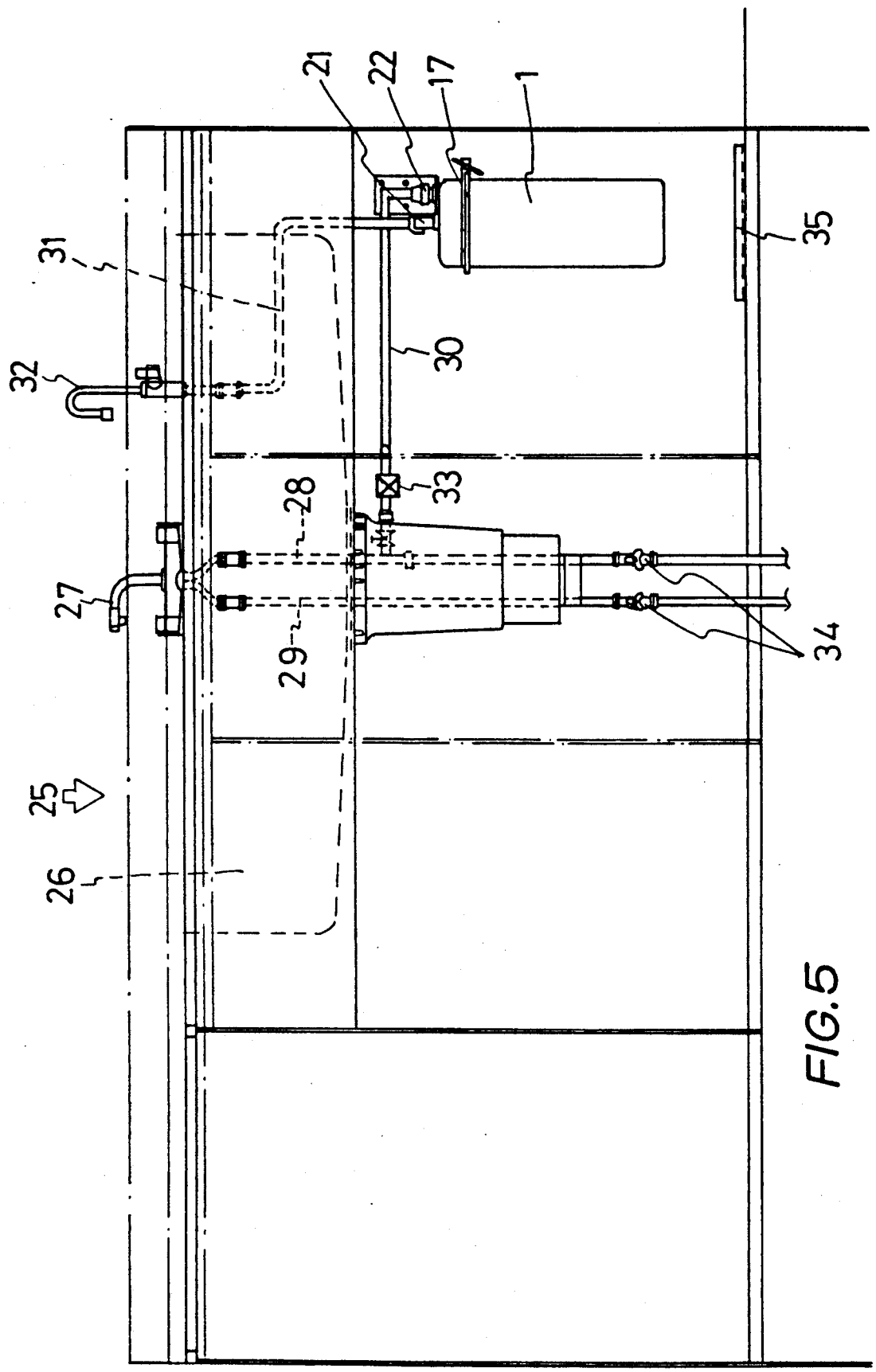
FIG. 5 is a front sectional view of a kitchen sink counter equipped with the water purifying device of this invention.
Figure 6:
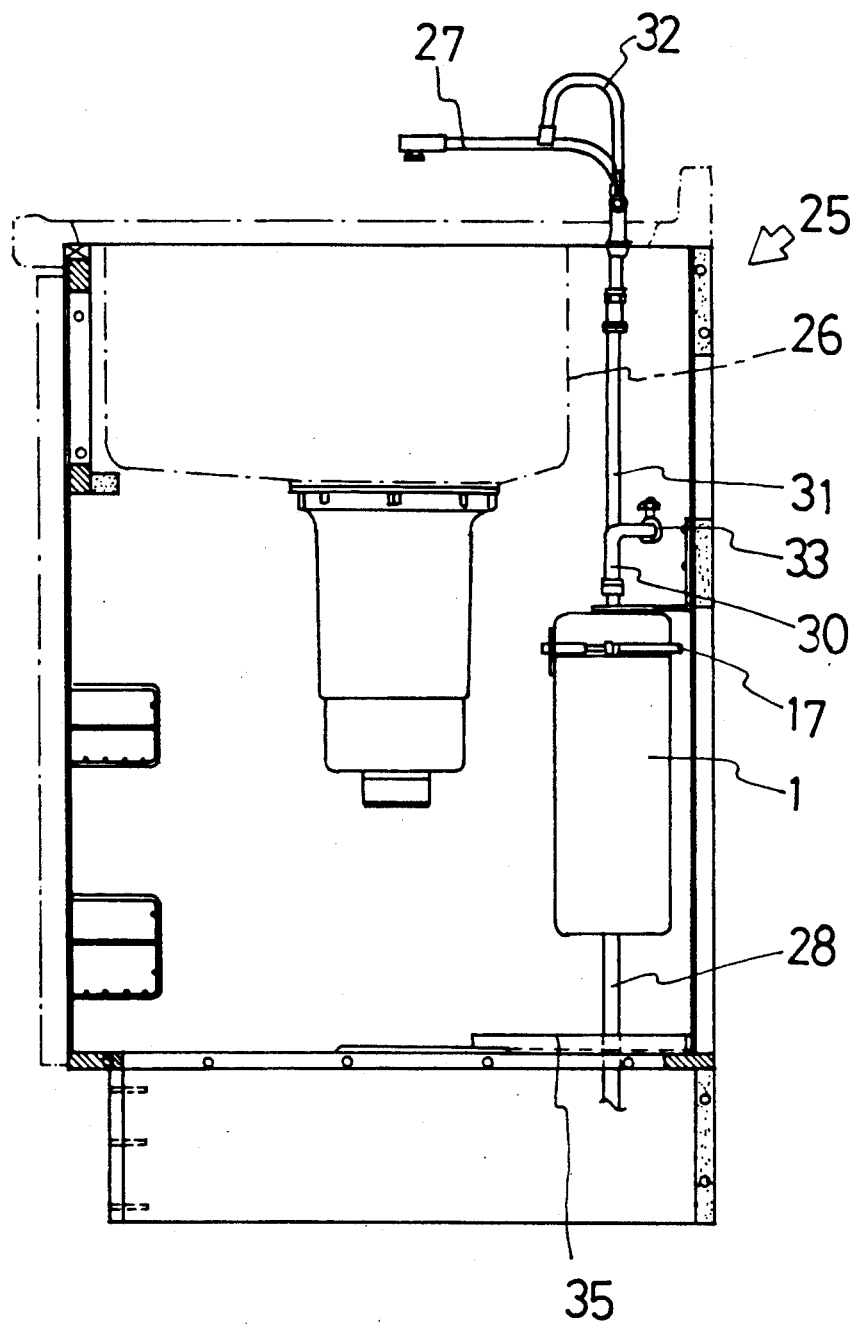
FIG. 6 shows a side sectional view of the assembly shown in FIG. 5.
Figure 7:
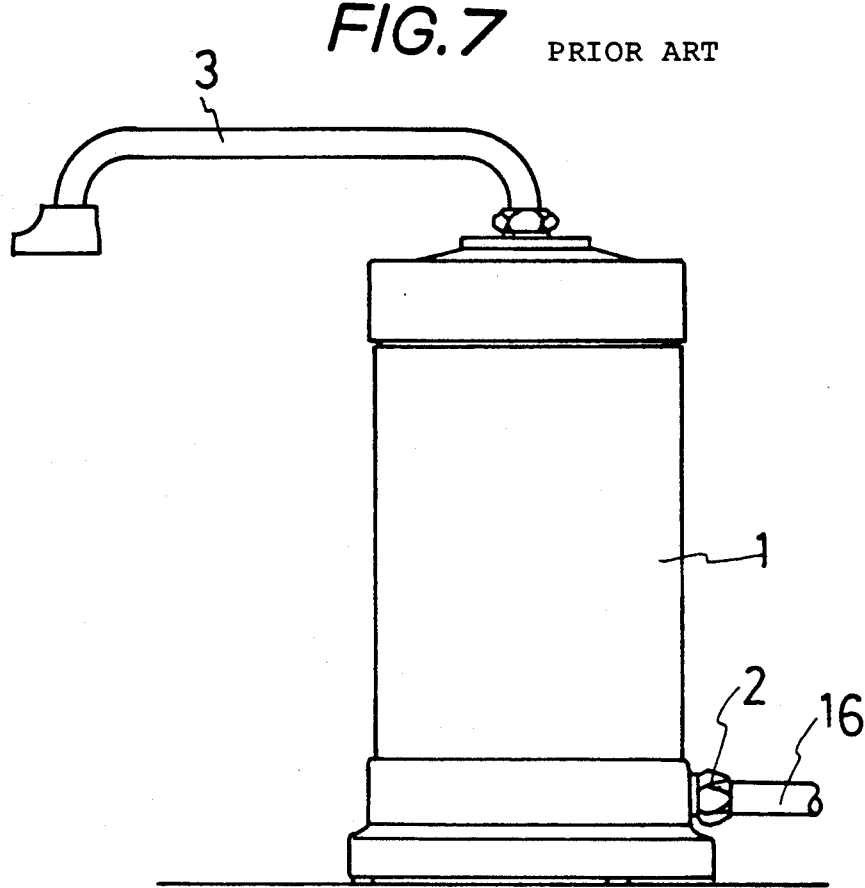
FIG. 7 is a front view of a conventional water purifying device.
Figure 8:
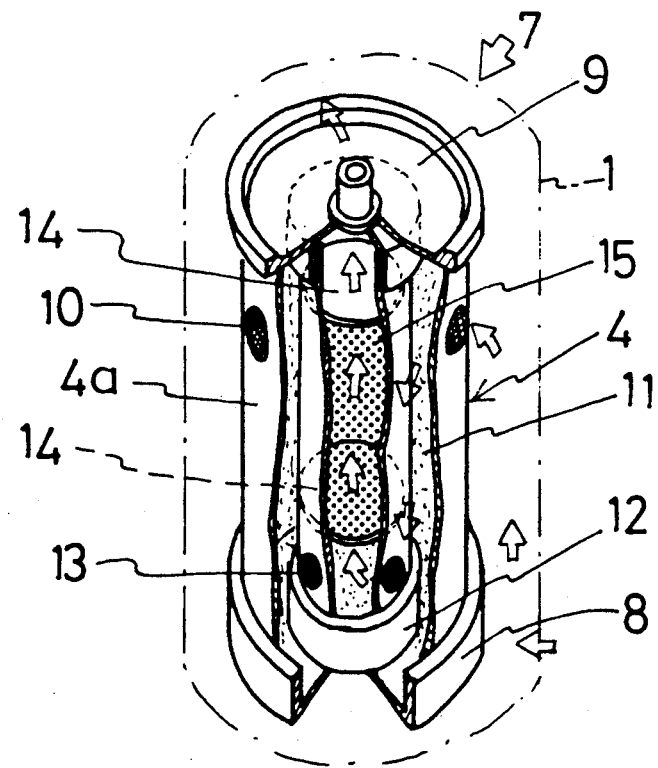
FIG. 8 is a partially sectional perspective view of the water purifying material container used in the conventional water purifying device shown in FIG. 7.

FIGS. 5 and 6 illustrate the mounting of the water purifying device of this invention in a kitchen sink counter 25.

The sink 26 is mounted in the kitchen sink counter 25, and tap water faucet 27 of a common type is located on the sink 26 and is connected with the water supply piping 28 and the hot water supply piping 29 through the kitchen sink counter 25. The water supply piping 28 is branched to the branch piping 30 which is then connected to the water inlet joint 22 of the water purifying device. The water outlet joint 21 of the water purifying device is connected to the water outlet piping 31 to extend above the kitchen sink counter 25, and the water outlet piping 31 is connected to the pure water faucet 32.

When a specially designed pressure reducing and checking valve 33 is inserted into the branch piping 30, the water pressure applied on the water purifying device can be kept at a constant level independent of the water supply piping 28 pressure which usually tends to vary in a multi-storied apartment house.

Constant water pressure secures a constant water flow rate. Stopcocks 34 are placed in the water supply piping 28 and the hot water supply piping 29. The drain pan 35 is placed under the water purifying device.

In FIG. 5, water flows through the piping 30, which branches from the water piping 28, and flows into the housing 1 via the water inlet joint 22. Then, as shown in FIG. 1, the water flows down into the housing 1 and enters the inside of the outer cylinder 4 through the connection holes 10 perforated on the lower cover plate 8 and flows up through the water purifying material layer of high purity active carbon 11 made from coconut shells to purify the water quality and flows into the intermediate cylinder 5 passing through the connection holes 13.

The water, which enters into the intermediate cylinder 5, flows down and passes through the purifying material layers of the silver-somelite 15, the ceramic balls 24, and the high purity active carbon 23, successively. Then the water enters the inner cylinder 6 through the connection hole 18 and flows up through the ceramic balls 24 which are packed inside of the inner cylinder 6. Finally, the water flows through the water outlet piping connected to the water outlet joint 21 above the kitchen sink counter 25 and flows out from the pure water faucet 32 as illustrated in FIG. 5.

As described above, the water fed into the housing 1 is sufficiently purified during passage through the water purifying materials which are packed in the three sections separated by the outer cylinder 4, intermediate cylinder 5, and the inner cylinder 6, all of which are coaxially mounted in the cartridge type water purifying material container 7. In addition, since the housing 1 is a closed high pressure vessel, high pressure water can be introduced into the housing 1, and the high water pressure can be effectively used allowing the water to flow through such a long path of purifying material layers.

Replacement of the purifying material container 7 is easily performed by closing the stopcock 34 on the water supply piping 28 and separating the cylindrical shell 1a from the top cover 1b after release of the metal tightening band 17. The water drained during replacement of the container 7 is collected in the drain pan 35.

This device can be combined with a water cooling apparatus, though such an assembly is not shown in the Figures. In that case, the water cooling apparatus is placed in the kitchen sink counter 25 adjacent to the water purifying device, and the water outlet piping 31 is connected to the water cooling apparatus to introduce the water which is purified by the water purifying device. The water cooling apparatus is adjusted to maintain the water temperature at around 17° C. and feeds the water to the pure water faucet 32. In this way, tasty water at an optimum temperature can be obtained at any time.

In another embodiment that is not shown in the Figures, a magnet may be attached near the water inlet joint 22 of the pure water faucet 30 or the water outlet joint 21 of the water outlet piping 31. The magnet is provided to remove the rust and/or a reddish color created thereby from the water and double filter the water.

The above described embodiment of this invention is built into the counter of the kitchen sink. However, the device can be used as a conventional table-top type purifier. Furthermore, it may be used not only for purifying city supplied water but also to purify polluted water using an enlarged purifying device of this invention.

I claim:

1. A water purifying device comprising a cylindrical housing equipped with a water inlet joint and a water outlet joint at a top cover of said housing, an outer cylinder coaxially mounted within said housing and having connection holes at a bottom of said outer cylinder to connect an inside space of said housing and an inside space of said outer cylinder, an intermediate cylinder coaxially mounted within said outer cylinder and having connection holes at a top portion of said intermediate cylinder across a wall of said intermediate cylinder, an upper cover plate air-tightly and commonly closing a top opening of both said outer cylinder and said intermediate cylinder with an air-tight fit, a lower cover plate commonly closing a bottom opening of both said outer cylinder and said intermediate cylinder, an inner cylinder coaxially mounted within said intermediate cylinder and having a top end projected from said upper cover plate to connect with said water outlet joint and having a connection hole at a lower end to open to an inner area of said intermediate cylinder, and water purifying materials packed in a gap between said outer cylinder and said intermediate cylinder and in a gap between said intermediate cylinder and said inner cylinder and in a space within said inner cylinder, and functioning so that water being introduced from said water inlet joint flows inside of said housing, of said outer cylinder, of said intermediate cylinder, and of said inner cylinder to be purified by said water purifying materials and flows out from said water outlet joint and wherein said water purifying material packed in the gap between said outer cylinder and said intermediate cylinder and in the gap between said intermediate cylinder and said inner cylinder contains active carbon made from coconut shell and wherein said water purifying material packed within said inner cylinder is ceramic balls.

2. A water purifying device of claim 1, wherein said housing is a closed pressure vessel.

3. A water purifying device of claim 1, wherein said housing is made of stainless steel and wherein said intermediate cylinder and said inner cylinder are made of synthetic resin.

* * * * *